July 20, 1965  C. B. SMALL  3,195,367
NOISE REDUCING TRANSMISSION
Filed Aug. 3, 1962
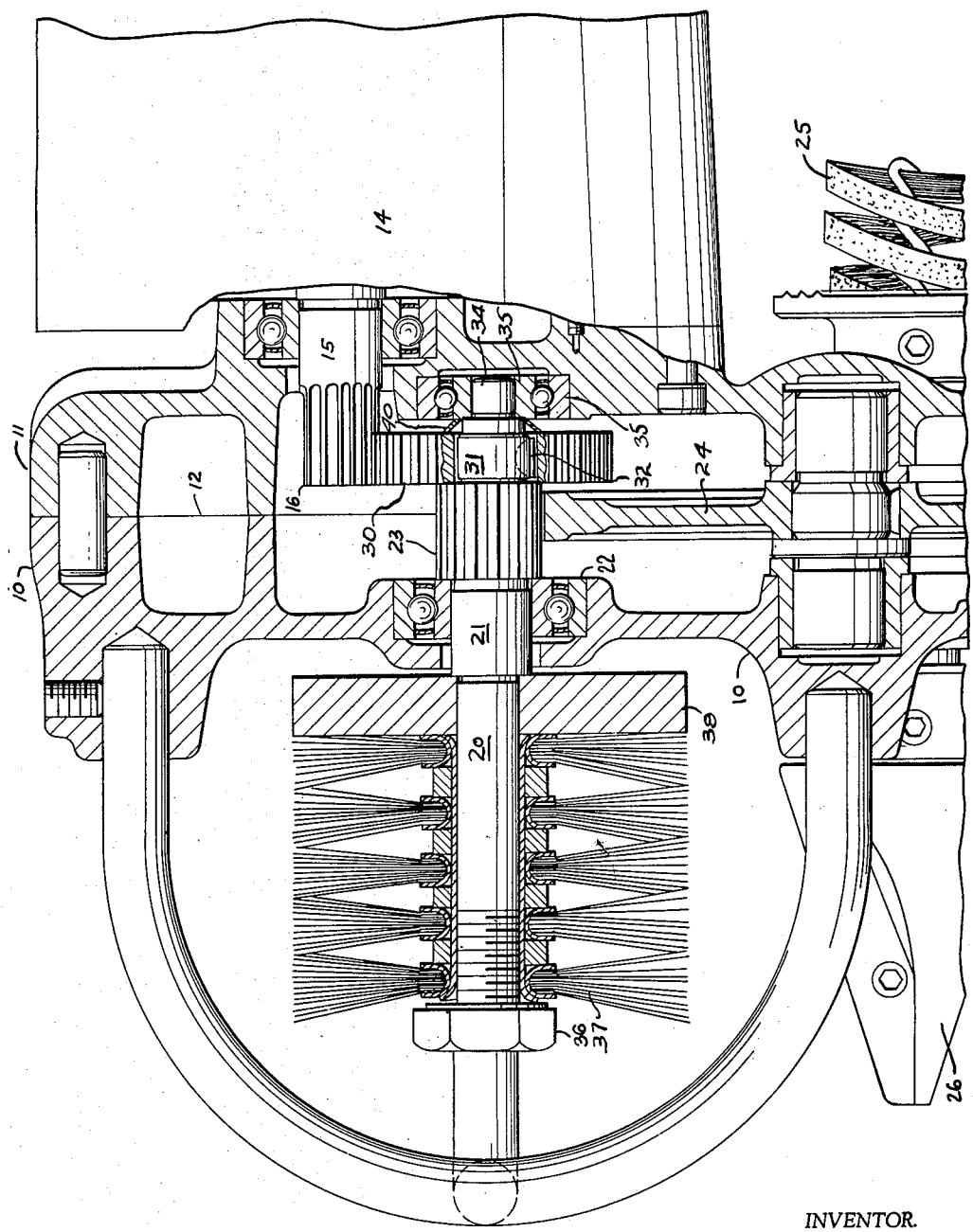
INVENTOR.
CHARLES B. SMALL
BY
*J. V. Douglas*
ATTORNEY

United States Patent Office 3,195,367
Patented July 20, 1965

3,195,367
NOISE REDUCING TRANSMISSION
Charles B. Small, Elyria, Ohio, assignor to The Ridge Tool Company, Elyria, Ohio, a corporation of Ohio
Filed Aug. 3, 1962, Ser. No. 214,557
2 Claims. (Cl. 74—443)

This invention relates to improvements in power transmission devices and more particularly to a noise reducing power transmission.

Heretofore a considerable amount of noise was realized where a shaft was mounted in a pair of spaced parallel walls and driven by gearing disposed between the walls. The walls acted to radiate and magnify the sound, thus rendering the impression that there was some defect in the device.

By the present invention, I have discovered a means for reducing that noise.

In the drawings:

The drawing is a sectional view through a portion of a machine utilizing my invention.

The drawing illustrates a portion of a machine for rotating a wire brush, which may be used for brushing copper tubing. It will be appreciated, however, that the invention is not limited to the particular machine disclosed since the disclosure is merely used as an example of an application of the invention.

As shown in the drawing, there is provided a housing which comprises a front casing 10 and a back casing 11 having meeting surfaces 12, and which are held together by bolts, not shown. The rear casing supports an electric motor 14, energized by a source of power not shown. The motor has a drive shaft 15 which is journalled in a bearing in the rear casing and which has drive teeth 16 at its forward end.

A driven shaft 20 is provided and comprises an enlarged portion 21, journalled in a bearing 22, which bearing is mounted in a recess in the front casing. Inwardly of the front casing there is provided a small spur gear 23, which may be integral with the shaft. The gear 23 meshes with a driven gear 24 for driving brushes such as 25 and reamers 26, also mounted in bearings in the front and rear casing.

Adjacent the gear 23 is an enlarged driven spur gear 30 which is mounted on a reduced portion 31 of the shaft and driven thereby by a Woodruff key 32 disposed in keyways in the gear and shaft. The inner end of the shaft is provided with a reduced part 34 which is journalled in a bearing 35 disposed in a recess in the rear housing. The other end of the shaft extends outwardly of the housing, being also of reduced diameter relative to the part 21. The end of the shaft is threaded, to receive a nut 36 which holds a wire brush assembly 37 and a metal disc 38 tightly against the shoulder formed by the junction of the enlarged part 21 and the reduced diameter end which receives the brush. The gear 30 is in mesh with the gear 16 and is driven by that gear.

Under normal conditions the gear 30 would ordinarily fit tightly with the shaft part 31 as would also be the case of the Woodruff key in the keyway in the gear and shaft. Under these conditions it was discovered that when the brush and disc assembly 37–38 were clamped by the nut 36, a vibration was set up in the casing parts around the bearings, the casing parts acting as a diaphragm much in the manner of a loud speaker, which made the device very noisy. Various types of shock absorbing means were utilized in attempt to deaden this noise but they were all ineffective. It should be pointed out that this noise was not due to the load placed against the brush when the machine was being used for its intended operation, namely, the cleaning of copper tubing, but was present when there was no load, and that it was only present after the brush an disc assembly were tightened on the shaft.

It was discovered that the noise could be completely eliminated by mounting the gear 30 on a hub 31 that was slightly smaller than the opening in the gear. In an assembly of the type shown in the drawing, as a specific example of the clearance space, .002 to .003 inch clearance was found to be sufficient. At the same time a similar clearance was provided for the Woodruff key and its keyways. In order to keep the gear, which now embodies a floating action, in the proper position on the shaft a dish or concavo-convex shaped spring washer 40 is provided with the small end engaging the inner race of the bearing 35 and the enlarged portion engaged with the rear face of the gear 30. This not only keeps the gear 30 in proper alignment with the gear 16 but also causes the gear to be perpendicular to the shaft, since the gear is pressed against the rear face of the gear 23.

Having thus described the invention, I am aware that numerous and extensive departures may be made therefrom without departing from the spirit or scope of the invention as defined by the appended claims.

I claim:

1. In combination a casing comprising spaced parallel members, aligned bearing means disposed in said members and a shaft rotatably journalled in said bearing means and having a reduced diameter portion extending beyond the casing, work processing means disposed on said shaft and clamped thereon, means for driving said shaft comprising a drive gear extending into the casing parallel to said shaft, a driven gear in mesh with said drive gear and surrounding and supported by said shaft, said shaft being provided with a shoulder and having a reduced portion adjacent the shoulder, said driven gear having an opening slightly larger than said last-mentioned reduced portion to provide a limited degree of tilting of the driven gear on the shaft, connector means between the gear and shaft and formed to provide limited movement between the connector, gear and shaft.

2. A device as described in claim 1, wherein spring means is provided having an enlarged portion adjacent the gear and wherein said bearing means includes inner and outer races and said spring means has a portion for engagement with the inner race.

References Cited by the Examiner
UNITED STATES PATENTS 2,089,410   8/37   Olson.
2,537,672   1/51   James _____ 74—411
2,867,130   1/59   Moeller _____ 74—443

DON A. WAITE, *Primary Examiner.*

BROUGHTON G. DURHAM, *Examiner.*